(No Model.)
W. L. HALEY.
CHURN.
No. 562,296. Patented June 16, 1896.
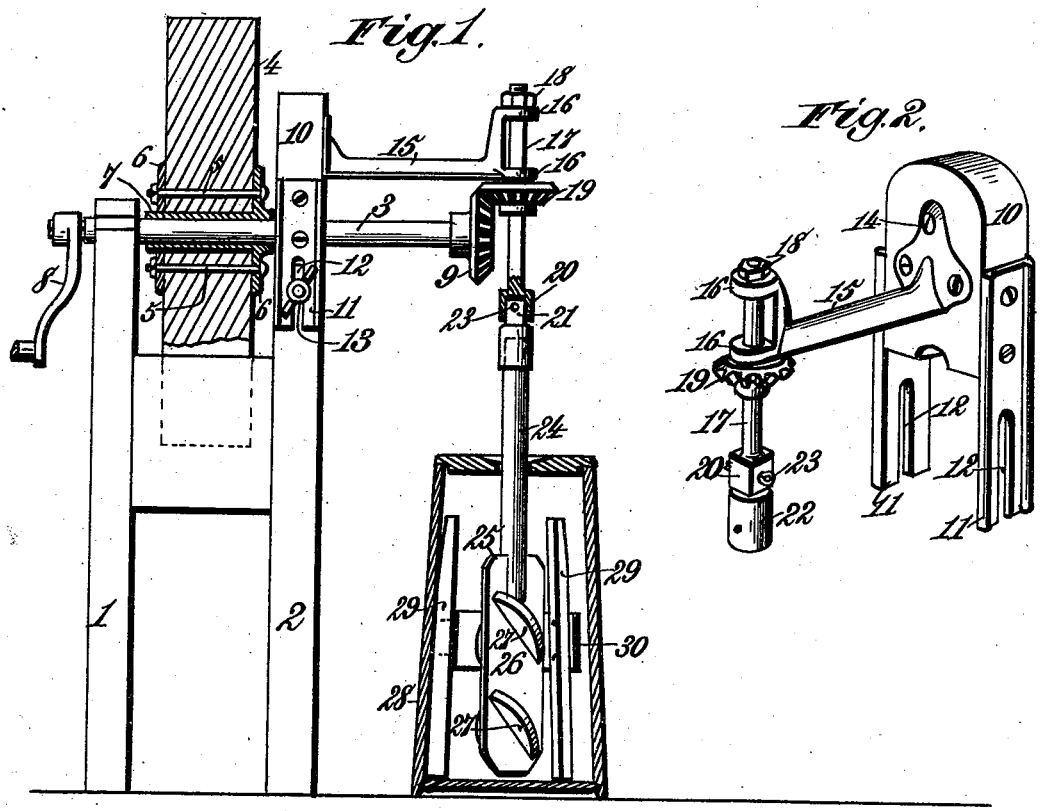
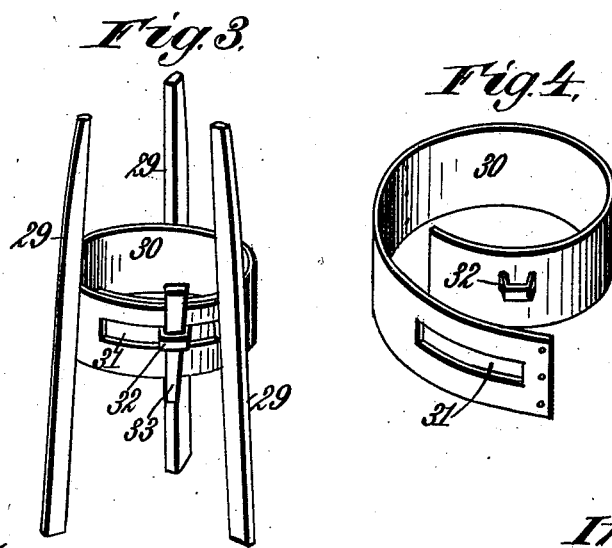
Witnesses.
Robert Everett,
Geo. N. Rea.
Inventor:
William L. Haley.
By James L. Norris.
Atty.

UNITED STATES PATENT OFFICE.

WILLIAM L. HALEY, OF CLEBURNE, TEXAS.

CHURN.

SPECIFICATION forming part of Letters Patent No. 562,296, dated June 16, 1896.

Application filed August 10, 1895. Serial No. 558,917. (No model.)

*To all whom it may concern:*

Be it known that I, WILLIAM L. HALEY, a citizen of the United States, residing at Cleburne, in the county of Johnson and State of Texas, have invented new and useful Improvements in Motors for Churns, of which the following is a specification.

My invention relates to means for adjustably securing a series of vertically-arranged breakers in a churn-body of any size, operating with a revolving dasher; and it consists in features of construction and novel combinations of parts, as hereinafter more particularly set forth.

In the annexed drawings, illustrating the invention, Figure 1 is a partly-sectional elevation of a churn with its revolving dasher and the motor therefor. Fig. 2 is a perspective of the detachable bracket and bracket-arm with rotary spindle and pivotally-attached socket for connection with the shaft or rod of a rotary dasher. Fig. 3 is a perspective of the series of breakers and their adjustable connecting-band. Fig. 4 is a detail view of said adjustable band.

Referring first to Fig. 1, the numerals 1 and 2 designate the parallel uprights of a suitable frame in which a horizontally-arranged rotary shaft 3 is mounted. The rotary shaft 3 is journaled in the uprights 1 and 2 and may represent the axle of a grindstone or flywheel 4, mounted between said uprights, as shown. The grindstone may be clamped, by means of bolts 5, between the flanged or disk ends 6 of a sleeve 7, secured to the rotary axle or shaft. On one end of the shaft or axle 3 is a crank 8, or any other suitable means may be provided for rotating said shaft or axle, whether by hand or power. The other end of the shaft or axle 3 is extended beyond the frame of the machine and carries a bevel gear-wheel 9, through which power may be applied to the dasher or churn, as presently explained.

To the top of one of the machine-uprights, as 2, is secured a detachable bracket 10, having on its opposite vertical side edges the depending straps or arms 11, in each of which is a longitudinal slot 12 for passage of a thumb-screw 13 by which the said bracket is detachably and adjustably fastened to its said supporting-upright. The outer side of the bracket 10 has detachably secured thereto, by screws 14 or otherwise, a horizontally-projecting bracket-arm 15, on the outer end of which are formed bearings 16 for a vertically-arranged and depending spindle 17, the upper end of which is provided with a nut 18, by which the said spindle is suspended in such manner that it may be rotated freely in its said bearings. Below the arm 15 the spindle 17 is provided with and carries a bevel gear-wheel 19, arranged to mesh with the similar gear-wheel 9 on the axle or shaft 3 of the grindstone or fly-wheel.

The lower end of the rotary spindle 17 has rigidly connected to, or formed thereon, a socket 20, Figs. 1 and 2, adapted to receive the shank portion 21 of a detachable and pivotally-connected socket-piece 22, the connection between the rigid socket 20 and the shank 21 being effected by means of a split pin 23, or other suitable device, and the parts being so arranged that the lower or pivoted socket 22 will have a slight degree of flexibility. Into this lower socket 22 is inserted the upper end of the rod or shaft 24 of a rotary churn-dasher 25, as shown in Fig. 1.

The pivotally-attached or yielding socket-piece 22 affords a flexible connection between the rotary spindle 17 and the dasher shaft or rod 24 to allow a suitable side play to the dasher and obviate any stiffness in the operation. The pivotally-supported socket-piece 22 may, however, be dispensed with and the dasher shaft or rod be then inserted into the fixed socket 20 on the rotary spindle. The adjustability of the bracket 10 on the upright 2 facilitates a proper engagement of the gears 9 and 19 and a suitable connection of the motor with the shaft or rod of the rotary dasher. It is obvious that rotation of the shaft or axle 3 will impart a similar movement to the churn-dasher, and at the same time a grindstone, mounted on and rotated with said shaft or axle, may be applied to its usual specific purposes.

The rotary dasher 25 consists of a flat vertically-arranged blade 26, having a series of inclined wings 27 on each side, the said wings being segmental in form and inclined in reverse directions on opposite sides of the blade 26, so as to impart somewhat of a spiral form to the dasher.

The churn body or casing 28 may be of any suitable or usual form, and I prefer to arrange therein, at suitable intervals, a series of vertically-arranged breaker-bars 29, Fig. 3, to assist the rotary dasher in breaking up the cream. These vertical breaker-bars 29 are held stationary in contact with the inner sides of the churn and are connected by an adjustable band 30, Figs. 3 and 4, so constructed as to be readily expanded or contracted to suit the diameter of different churn-bodies. The adjustable band 30 may be composed of a strip of sheet metal and the vertical breaker-bars 29 are secured thereto, at suitable intervals, by rivets or otherwise. One end of the band 30 is provided with a lengthened longitudinally-arranged slot 31 and on the outer side of the band, near its other end, is an eye or loop 32, adapted to be engaged in said slot at any desired point and be secured at the required adjustment by means of a wedge 33, passed through said eye or loop from the outside of the band. It will be seen, therefore, that the adjustable band 30 affords a convenient and secure means for adjusting the breaker-bars 29 to any size of churn and for holding them properly in place.

The motor is easily operated and can be quickly attached to and detached from a churn. All its parts are detachable and can be readily taken apart and packed away when not required for use; and there are no parts or devices liable to become broken or disarranged.

What I claim as my invention is—

1. The combination with a churn and the rotary dasher and motor, of a series of vertically-arranged breaker-bars, and an adjustable band connecting the breaker-bars and adapted to secure them in churns of different sizes, substantially as described.

2. The combination with a churn and its rotary dasher and motor, of the series of vertically-arranged breaker-bars 29, the adjustable band 30 connecting said breaker-bars and provided with the slot 31 and loop 32, and the wedge 33 whereby the said band can be expanded and contracted to secure the breaker-bars in churns of different diameter, substantially as described.

In testimony whereof I have hereunto set my hand in presence of two subscribing witnesses.

WILLIAM L. HALEY.

Witnesses:
J. CASE,
L. M. LAYTON.